United States Patent
Shimada et al.

(10) Patent No.: US 8,582,494 B2
(45) Date of Patent: Nov. 12, 2013

(54) DATA RELAY DEVICE AND FRAME PROCESSING METHOD BY THE SAME

(75) Inventors: Hirokazu Shimada, Kawasaki (JP); Yoshimi Toyoda, Kawasaki (JP); Hideki Yoshitome, Kawasaki (JP); Satoshi Maeda, Kawasaki (JP); Chie Eiza, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 228 days.

(21) Appl. No.: 13/009,294

(22) Filed: Jan. 19, 2011

(65) Prior Publication Data

US 2011/0116440 A1 May 19, 2011

Related U.S. Application Data

(63) Continuation of application No. PCT/JP2008/063695, filed on Jul. 30, 2008.

(51) Int. Cl.
| | |
|---|---|
| *H04B 7/14* | (2006.01) |
| *H04J 1/10* | (2006.01) |
| *H04J 3/08* | (2006.01) |
| *H04J 3/00* | (2006.01) |
| *H04J 3/06* | (2006.01) |

(52) U.S. Cl.
USPC ............................ 370/315; 370/336; 370/350

(58) Field of Classification Search
None
See application file for complete search history.

(56) References Cited

U.S. PATENT DOCUMENTS

| | | |
|---|---|---|
| 2004/0184487 A1 | 9/2004 | Kim |
| 2011/0032910 A1* | 2/2011 | Aarflot et al. .................. 370/335 |

FOREIGN PATENT DOCUMENTS

| | | |
|---|---|---|
| JP | 2006-515489 | 5/2006 |
| JP | 2006-211016 | 8/2006 |
| JP | 2007-259294 | 10/2007 |
| JP | 2008-011498 | 1/2008 |
| JP | 2008-022144 | 1/2008 |

OTHER PUBLICATIONS

International Search Report issued for corresponding International Patent Application No. PCT/JP2008/063695, mailed Sep. 9, 2008.

* cited by examiner

*Primary Examiner* — Derrick Ferris
*Assistant Examiner* — Kodzovi Acolatse
(74) *Attorney, Agent, or Firm* — Myers Wolin, LLC

(57) ABSTRACT

A data relay device relays data between a base station device and a base station control device. The data relay device includes a data transmission time acquiring unit that acquires a data transmission time from when data is transmitted from the data relay device to when the data is received by the data relay device via the base station device, a frame value detecting unit that detects a predetermined frame value from a frame transmitted from the base station control device and stores the data, and a frame transmitting unit that, when the predetermined frame value is detected, after a predetermined time elapses in addition to the data transmission time acquired by the data transmission time acquiring unit after detection, transmits a frame having the same frame value as the detected one to a transmission source of the frame from which the predetermined frame value is detected.

6 Claims, 8 Drawing Sheets

FIG.3
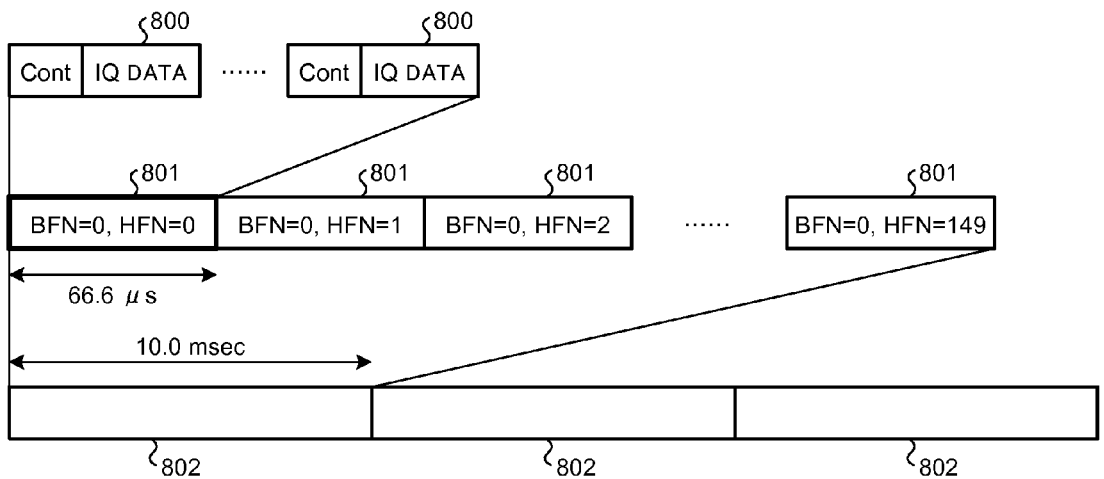
FIG.4
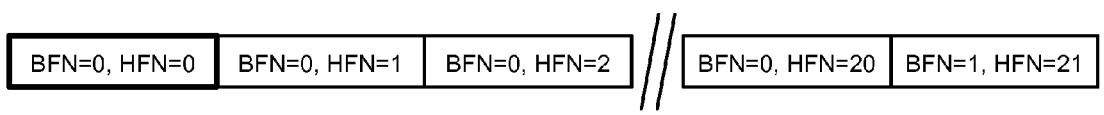
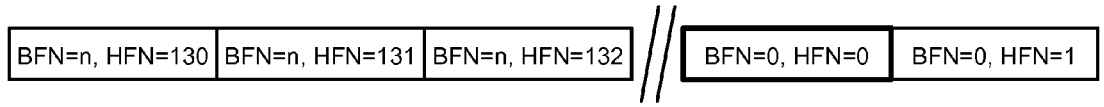

DATA RELAY DEVICE AND FRAME PROCESSING METHOD BY THE SAME

CROSS-REFERENCE TO RELATED APPLICATION

This application is a continuation of International Application No. PCT/JP2008/063695, filed on Jul. 30, 2008, the entire contents of which are incorporated herein by reference.

FIELD

The embodiments discussed herein are directed to a data relay device that relays data transmitted from a base station device that performs radio communications with a mobile terminal to a base station control device that controls the base station device and relays data transmitted from the base station control device to the base station device and a frame processing method by the data relay device, and, for example, relates to a data relay device in which each base station control device can measure a data transmission time for round trip between its own device and the base station device even when a plurality of base station control devices shares the base station device and a frame processing method by the data relay device.

BACKGROUND

In a conventional communication system, a data transmission delay time between devices that perform communications is measured. In a radio communication system that conforms to a common public radio interface (CPRI) standard, measurement of a T14 delay between a radio equipment control (REC) device and a radio equipment (RE) device has been known (see Japanese Laid-open Patent Publication No. 2008-11498).

The T14 delay is referred to as a time from when a frame which is the basis is transmitted from the REC device to when the frame is relayed to a terminal RE device and then received by the REC device again. The T14 delay is measured by each of the REC devices within the above described system. An adjustment of making the T14 delays of the REC devices uniform is performed by forcibly extending the T14 delay of each REC device to be equivalent to the longest one among the T14 delays measured by the REC devices, that is, by adding time to a shorter delay time. Such an adjustment is desirable for preventing any failure at the time of handover of the mobile terminal.

A technique of measuring the T14 delay is defined in the CPRI standard. A T14 delay measuring technique stated in the CPRI standard (v3.0) will be explained below with reference to FIGS. 10 and 11.

A case in which a REC device 1100, a RE device 1200, and a RE device 1300 are connected in series as illustrated in FIG. 10 is explained as an example. In this case, the T14 delay is referred to as a time from when a frame which is the basis is output from an output terminal R1 of the REC device 1100 to when the frame is input to an input terminal R4 of the REC device 1100 via an input terminal RB2 and an output terminal RB1 of the RE device 1200, an input terminal R2 and an output terminal R3 of the RE device 1300, and an input terminal RB4 and an output terminal RB3 of the RE device 1200. That is, the T14 delay is "T12(1)+T delay DL(1)+T12(2)+T offset(2)+T34(2)+T delay UL(1)+T34(1)."

T12(1) is referred to as a transmission time from when the frame is output from R1 to when the frame is input to RB2. T delay DL(1) is referred to as a processing time until the RE device 1200 outputs the frame input from RB2 through RB1. T12(2) is referred to as a transmission time from when the frame is output from RB1 to when the frame is input to R2. T offset(2) is referred to as a processing time until the RE device 1300 outputs the frame input from R2 through R3. T34(2) is transmission time from when the frame is output from R3 to when the frame is input to RB4. T delay UL(1) is referred to as a processing time until the RE device 1200 outputs the frame input from RB4 through RB3. T34(1) is referred to as a transmission time from when the frame is output from RB3 to when the frame is input to R4.

The frame input to RB2 of the RE device 1200 is branched at RB2 and is output from RB1 and output from RB3. T offset(1) is referred to as a processing time until the RE device 1200 outputs the frame input from RB2 through RB3. Therefore, in the REC device 1100, even though a time from when the frame which is the basis is output from R1 to when the frame is input to R4 is simply measured, the measuring result is not the T14 delay but a time from when the frame which is the basis is output from R1 of the REC device 1100 to when the frame is input to R4 of the REC device 1100 via RB2 and RB3 of the RE device 1200.

The RE device 1200 performs marking by giving information at a timing when the frame that is branched at RB2 and output from RB3, and the frame serving as the basis, that is branched at RB2, output from RB1, input to RB4 via R2 and R3 of the RE device 1300 and then returned, are superimposed on each other.

That is, as illustrated in FIG. 11, a frame 1400 as the basis output from R1 is input to RB2 after T12(1). The frame 1400 is output from RB1 after T delay DL(1). At this time, one frame 1400 branched at RB2 is output from RB3 after T offset(1). Returning to the frame 1400 output from RB1, the frame 1400 is input to R2 after T12(2). The frame 1400 is output from R3 after T offset(2). The frame 1400 is input to RB4 after T34(2). The frame 1400 is superimposed on one frame 1400 branched at RB2 at a timing indicated in FIG. 11 after T delay UL(1) and output from RB3. The frame 1400 is input to R4 after T34(1). As described above, in the T14 delay measuring technique stated in the CPRI standard (v3.0), the REC device 1100 measures the time from when the frame 1400 is output to when information given to the frame 1400 that is input to RB4 and returned is detected as the T14 delay.

DISCLOSURE OF INVENTION

Problem to be Solved by the Invention

In the radio communication system that conforms to the CPRI standard, a technique of sharing the RE device between a plurality of REC devices having different radio systems was suggested. Even in such a radio communication system, the T14 delay is measured by each REC device within the system and desirably used, for example, not to cause any failure at the time of handover. However, in the T14 delay measuring technique stated in the CPRI standard (v3.0), there is a problem in that the REC device that cannot measure the T14 delay is present.

For example, as illustrated in FIG. 12, a system in which a data relay device 1700 is disposed between a REC device 1500 and a REC device 1600 and a RE device 1800 is considered. The data relay device 1700 multiplexes or demultiplexes data of each REC device so that the REC device 1500 and the REC device 1600 can share the RE device 1800.

In this case, the REC device 1500 and the REC device 1600 independently produce frames and transmit the frames to the data relay device 1700, respectively. However, as the frame exchanged between the data relay device 1700 and the RE device 1800, any one of the frames may be used. For this reason, for example, when the frame produced by the REC device 1500 is exchanged between the data relay device 1700 and the RE device 1800, the REC device 1600 receives the frame, which is different from the frame transmitted to the data relay device 1700, from the data relay device 1700. Each frame is independently produced by each REC device and is not synchronized. Therefore, the REC device 1600 cannot measure the T14 delay through the T14 delay measuring technique stated in the CPRI standard (v3.0) even though marking is performed on the received frame.

SUMMARY

According to an aspect of an embodiment of the invention, a data relay device for relaying data transmitted from a base station device that performs radio communication with a mobile terminal to a base station control device that controls the base station device and relaying data transmitted from the base station control device to the base station device, the device includes a data transmission time acquiring unit that acquires a data transmission time from when data is transmitted from the data relay device to when the data is received by the data relay device via the base station device, a frame value detecting unit that detects a predetermined frame value from a frame that is transmitted from the base station control device and stores the data, and a frame transmitting unit that, when the predetermined frame value is detected by the frame value detecting unit, after a predetermined time elapses in addition to the data transmission time acquired by the data transmission time acquiring unit after detection, transmits a frame having the same frame value as the detected frame value to a transmission source of the frame from which the predetermined frame value is detected.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a view for explaining a frame that conforms to a CPRI standard;

FIG. 4 is a view for explaining a detection process of a frame value detecting unit;

DESCRIPTION OF EMBODIMENTS

Preferred embodiments of the present invention will be explained with reference to accompanying drawings.

[a] First Embodiment

First, an overview of a data relay device according to a first embodiment will be explained. The data relay device according to the first embodiment is connected with two radio equipment control (REC) devices and one radio equipment (RE) device in a radio communication system that conforms to the common public radio interface (CPRI) standard. One or more RE devices may be connected to the data relay device. The data relay device multiplexes data received from each REC device and then relays the data to the RE device or demultiplexes data received from the RE device and then relays the data to each REC device. Each REC device shares the RE device connected via the data relay device through the data replay performed by the data relay device.

Figure 1:
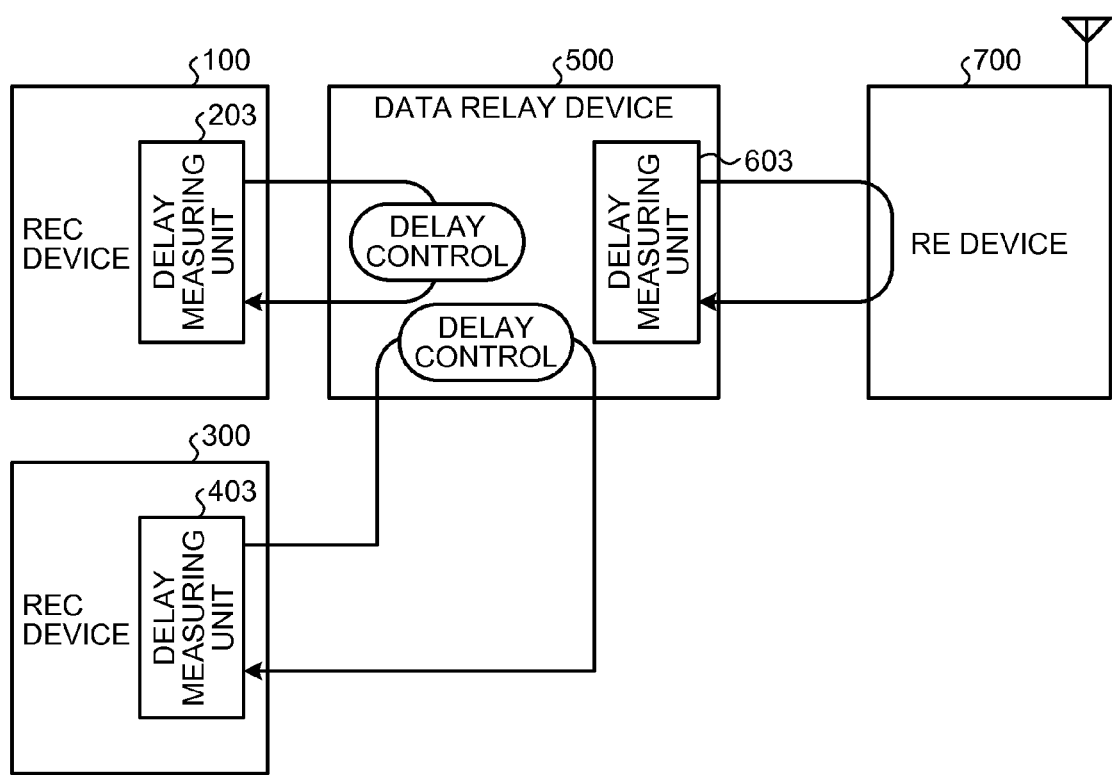
FIG. 1 is a view for explaining an overview of processing by a data relay device.

An overview of processing performed by the data relay device will be explained with reference to FIG. 1. As illustrated in FIG. 1, a data relay device 500 measures a delay amount between its own device and a RE device 700 by transmitting a frame independently produced by its own device to the RE device 700 and receiving the frame from the RE device 700. Specifically, the data relay device 500 includes a delay measuring unit 603 and measures a time from when a frame which is the basis is transmitted from its own device to when the frame is received by its own device again via the RE device 700 through the delay measuring unit 603.

Further, even when another RE device is connected to the RE device 700 in serial, the data relay device 500 can measure a time from when the frame which is the basis is transmitted from its own device to when the frame is received by its own device again via a terminal RE device based on the T14 delay measuring technique stated in the CPRI standard (v3.0).

A REC device 100 and a REC device 300 each measures a delay amount between its own device and the data relay device 500 by transmitting a frame independently produced by its own devices to the data relay device 500 and receiving the frame from the data relay device 500. Specifically, the REC device 100 includes a delay measuring unit 203 and measures a time from when the frame which is the basis is transmitted from its own device to when the frame is received by its own device again through the delay measuring unit 203. Further, the REC device 300 includes a delay measuring unit 403 and measures a time from when the frame which is the basis is transmitted from its own device to when the frame is received by its own device again through the delay measuring unit 403 in the similar manner.

The data relay device 500 performs delay control of delaying a time for returning the frame, which is the basis, received from the REC device 100 to the REC device 100 by a time that is equivalent to the sum of a measurement result measured by the delay measuring unit 603 and the processing time required for data relay of its own device. The data relay device 500 performs the same delay control on the frame which is the basis received from the REC device 300. The processing time required for data relay of the data relay device 500 is a known value specific to the device.

As a result, the measurement result performed by the REC device 100 is a time from when the frame which is the basis is output from the REC device 100 to when the frame is input to the REC device 100 via the data relay device 500, the RE device 700, and the data relay device 500 again, that is, the T14 delay of the REC device 100. The measurement result measured by the REC device 300 is also similarly the T14 delay of the REC device 300. According to the data relay device 500 of the first embodiment, even when the RE device 700 is shared by the REC device 100 and the REC device 300, each REC device can measure the T14 delay of its own device.

Figure 2:
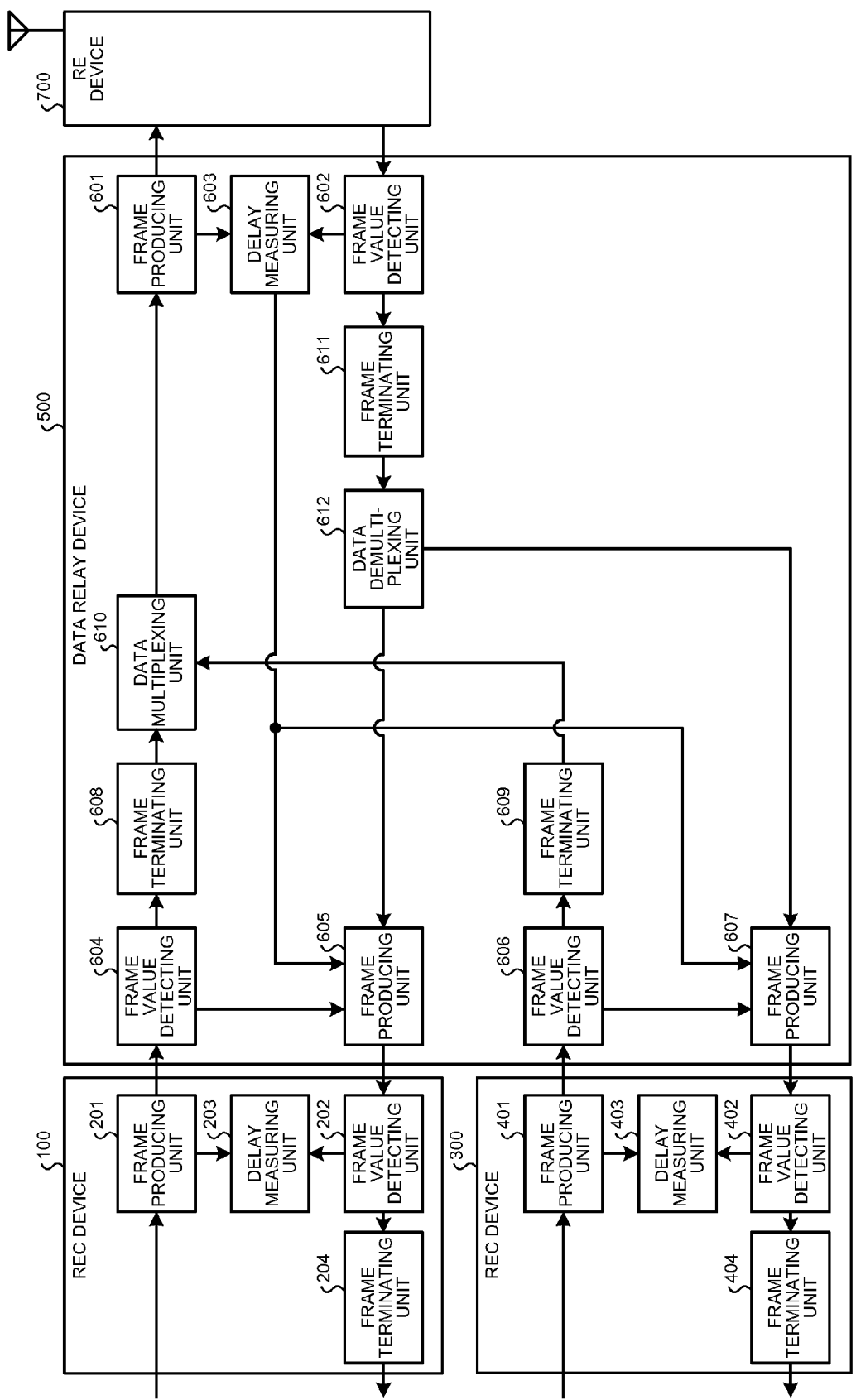
FIG. 2 is a block diagram illustrating structures of a REC device, a REC device and a data relay device.

Next, structures of the REC device 100, the REC device 300, and the data relay device 500 will be explained with reference to FIG. 2. FIG. 2 is a block diagram illustrating the structures of the REC device 100, the REC device 300, and the data relay device 500. As illustrated in FIG. 2, the REC device 100 includes a frame producing unit 201, a frame value detecting unit 202, a delay measuring unit 203, and a frame terminating unit 204. The REC device 300 includes a frame producing unit 401, a frame value detecting unit 402, a delay measuring unit 403, and a frame terminating unit 404. The data relay device 500 includes a frame producing unit 601, a frame value detecting unit 602, a delay measuring unit 603, a frame value detecting unit 604, a frame producing unit 605, a frame value detecting unit 606, a frame producing unit 607, a frame terminating unit 608, a frame terminating unit 609, a data multiplexing unit 610, a frame terminating unit 611, and a data demultiplexing unit 612. FIG. 2 illustrates only the structures of the REC device 100 and the REC device 300 related to T14 delay measurement. A processing operation of each of the components related to T14 delay measurement will be first explained below, and a typical processing operation in a radio communication system will then be explained.

The frame producing unit 601 of the data relay device 500 produces the frame that conforms to the CPRI standard and transmits the frame to the RE device 700. A frame that conforms to the CPRI standard will be explained with reference to FIG. 3. As illustrated in FIG. 3, a frame 800 is called a basic frame and is configured with 16 words. A variety of control information is stored in a 0-th word of the basic frame, and data transmitted and received in the radio communication system is stored in remaining first to fifteenth words as IQ data. A frame 801 is configured with 256 basic frames, and the frame 801 is called a hyper frame. A frame 802 is configured with 150 hyper frames, and the frame 802 is called a UMTS Node B frame.

The frame producing unit 601 produces the frame 802 illustrated in FIG. 3. The frame producing unit 601 stores a frame value in each hyper frame. The frame value includes a hyper frame number (HFN) and a UMTS Node B frame number (BFN). The frame producing unit 601 decides the frame value to be stored in the hyper frame by counting up a number at every 66.6 microsecond and counting up a number at every 10.0 millisecond. For example, when BFN=0 and HFN=0 are stored in a certain hyper frame as an initial value of the frame value, the frame producing unit 601 counts up the HFN from 0 to 1 after 66.6 microseconds and then stores BFN=0 and HFN=1 in the next hyper frame. This is the same as in the frame producing unit 605, the frame producing unit 607, the frame producing unit 201 of the REC device 100, and the frame producing unit 401 of the REC device 300 which will be described later.

When the frame value to be stored in the hyper frame is the same value as a preset frame value, the frame producing unit 601 outputs a control signal to the delay measuring unit 603. That is, the hyper frame having this frame value stored therein is the frame which is the basis for measuring the delay amount between the data relay device 500 and the RE device 700, and the preset frame value is, for example, BFN=0 and HFN=0.

The frame value detecting unit 602 detects the frame value of the frame transmitted from the RE device 700. Specifically, the frame value detecting unit 602 detects the frame value of the frame that is received by the data relay device 500 and is to be input to the frame terminating unit 611 which will be described later. When the detected frame value is the same as the preset frame value, the frame value detecting unit 602 outputs the control signal to the delay measuring unit 603. That is, the hyper frame from which the frame value equal to the preset frame value is detected is the frame which is the basis transmitted from the frame producing unit 601 to measure the delay amount between the data relay device 500 and the RE device 700. The preset frame value is preferably the same value as the frame value set by the frame producing unit 601 and, for example, BFN=0 and HFN=0.

The delay measuring unit 603 measures the delay amount between the data relay device 500 and the RE device 700. Specifically, the delay measuring unit 603 measures an elapsed time from when the control signal is received from the frame producing unit 601 to when the control signal is received from the frame value detecting unit 602. The delay measuring unit 603 outputs the measurement result to the frame producing unit 605 and the frame producing unit 607.

The frame producing unit 201 of the REC device 100 produces a frame that conforms to the CPRI standard and transmits the frame to the data relay device 500. Similarly to the frame producing unit 601, the frame producing unit 201 stores the frame value in the hyper frame and outputs the control signal when the stored frame value is the same value as a preset frame value. For example, the preset frame value is BFN=0 and HFN=0.

The frame value detecting unit 604 of the data relay device 500 detects the frame value of the frame transmitted from the REC device 100. Specifically, the frame value detecting unit 604 detects the frame value of the frame that is received by the data relay device 500 and is to be input to the frame terminating unit 608 which will be described later. When the detected frame value is the same as the preset frame value, the frame value detecting unit 604 outputs the detected frame value to the frame producing unit 605. The preset frame value is preferably the same as the frame value set by the frame producing unit 201 and, for example, BFN=0 and HFN=0.

The frame producing unit 605 produces the frame that conforms to the CPRI standard and transmits the frame to the REC device 100. Specifically, when the frame value is received from the frame value detecting unit 604, the frame producing unit 605 starts to produce the frame and transmits the frame to the REC device 100. The frame value stored in the head hyper frame is a frame value changed based on the measurement result input from the delay measuring unit 603 and the processing time required for data relay of the data relay device 500 which is a known value. That is, the frame producing unit 605 computes how many time intervals at which the number of the hyper frames or the number of the UMTS Node B frames is counted up, are included in a total time that is equivalent to the sum of the measurement result and the processing time. The frame producing unit 605 stores a frame value, which is put back from the frame value received from the frame value detecting unit 604 by the measurement result, in the head hyper frame. For example, it is assumed that the frame value received from the frame value detecting unit 604 is BFN=0 and HFN=0, and the total time is 10.666 milliseconds. Then, the frame producing unit 605 obtains 1 by dividing 10.666 by 10. Moreover, the frame producing unit 605 obtains 10 by dividing 0.666 by 0.0666. As a result, the frame producing unit 605 stores BFN=n−1 and HFN=140 in the head hyper frame. "n" is a maximum value obtainable as BFN. That is, if n is further counted up, it returns to 0.

The frame value detecting unit 202 detects the frame value transmitted from the data relay device 500. Specifically, the frame value detecting unit 202 detects the frame value of the frame that is received by the REC device 100 and is to be input to the frame terminating unit 204 which will be described later. The frame value detecting unit 202 outputs the control signal to the delay measuring unit 203 when the detected frame value is the same as the preset frame value. That is, the hyper frame from which the frame value equal to the preset frame value is detected is the frame which is the basis for measuring the T14 delay of the REC device 100. The preset frame value is preferably the same as the frame value set by the frame producing unit 201 and, for example, BFN=0 and HFN=0.

A detection process of the frame value detecting unit 202 will be explained with reference to FIG. 4. If the frame is transmitted from the data relay device 500 to the REC device 100 in a state in which the frame value is not changed, the head of the frame to be input to the frame value detecting unit 202 becomes the hyper frame in which the frame value of BFN=0 and HFN=0 is stored as illustrated in FIG. 4. However, the frame producing unit 605 changes the frame value based on the measurement value and the processing time, so that the frame to be input to the frame value detecting unit 202 becomes the hyper frame in which the frame value of, for example, BFN=n (n is a maximum value obtainable as BFN. That is, if n is further counted up, it returns to 0) and HFN=130 are stored. As a result, the frame value detecting unit 202 detects the frame value BFN=0 and HFN=0 with delay compared to the case in which the frame value is not changed. A difference of a detection time is equal to the sum of the measurement result of the delay measuring unit 603 and the processing time, required for data relay, specific to the data relay device 500.

The delay measuring unit 203 measures the T14 delay of the REC device 100. The delay measuring unit 203 specifically measures an elapsed time from when the control signal is received from the frame producing unit 201 to when the control signal is received from the frame value detecting unit 202.

A processing operation performed, after delay measurement of the delay measuring unit 603, by the frame producing unit 401, the frame value detecting unit 402, and the delay measuring unit 403 of the REC device 300, and the frame value detecting unit 606 and the frame producing unit 607 of the data relay device 500 is the same as in the frame producing unit 201, the frame value detecting unit 202, and the delay measuring unit 203 of the REC device 100, and the frame value detecting unit 604 and the frame producing unit 605 of the data relay device 500, and thus description thereof will not be repeated.

The frame producing unit 401 is independently controlled by the REC device 300 and may not be synchronized with the frame producing unit 201 of the REC device 100 in connection with production of the frame. However, similarly to REC device 100, the T14 delay can be measured by delay control of the frame through the frame producing unit 605 of the data relay device 500. The processing operation of each of the components related to T14 delay measurement has been described above. Next, a typical processing operation in the radio communication system will be explained.

The frame producing unit 201 of the REC device 100 stores data received from a higher-level device (not illustrated) in the radio communication system in the frame that conforms to the CPRI standard and transmits the frame to the data relay device 500. The frame producing unit 401 of the REC device 300 performs the same processing as in the frame producing unit 201.

The frame terminating unit 608 of the data relay device 500 receives the frame received by the data relay device 500 from the REC device 100 via the frame value detecting unit 604 and outputs data obtained from the frame to the data multiplexing unit 610. The frame terminating unit 609 receives the frame received by the data relay device 500 from the REC device 300 via the frame value detecting unit 606 and outputs data obtained from the frame to the data multiplexing unit 610.

The data multiplexing unit 610 multiplexes data input from the frame terminating unit 608 and data input from the frame terminating unit 609 and outputs the multiplexing result to the frame producing unit 601. The frame producing unit 601 stores data input from the data multiplexing unit 610 in the frame that conforms to the CPRI standard and transmits the frame to the RE device 700.

The frame terminating unit 611 receives the frame received by the data relay device 500 from the RE device 700 via the frame value detecting unit 602 and outputs data obtained from the frame to the data demultiplexing unit 612. The data demultiplexing unit 612 demultiplexes data input from the frame terminating unit 611 into data to be transmitted to the REC device 100 and data to be transmitted to the REC device 300. The data demultiplexing unit 612 outputs data to be transmitted to the REC device 100 to the frame producing unit 605 and outputs data to be transmitted to the REC device 300 to the frame producing unit 607.

The frame producing unit 605 stores data input from the data demultiplexing unit 612 in the frame that conforms to the CPRI standard and transmits the frame to the REC device 100. The frame producing unit 607 stores data input from the data demultiplexing unit 612 in the frame that conforms to the CPRI standard and transmits the frame to the REC device 300.

The frame terminating unit 204 of the REC device 100 receives the frame received by the REC device 100 from the data relay device 500 via the frame value detecting unit 202 and transmits data obtained from the frame to a higher-level (not illustrated) in the radio communication system.

The frame terminating unit 404 of the REC device 300 receives the frame received by the REC device 300 from the data relay device 500 via the frame value detecting unit 402 and transmits data obtained from the frame to a higher-level (not illustrated) in the radio communication system.

Figure 5:
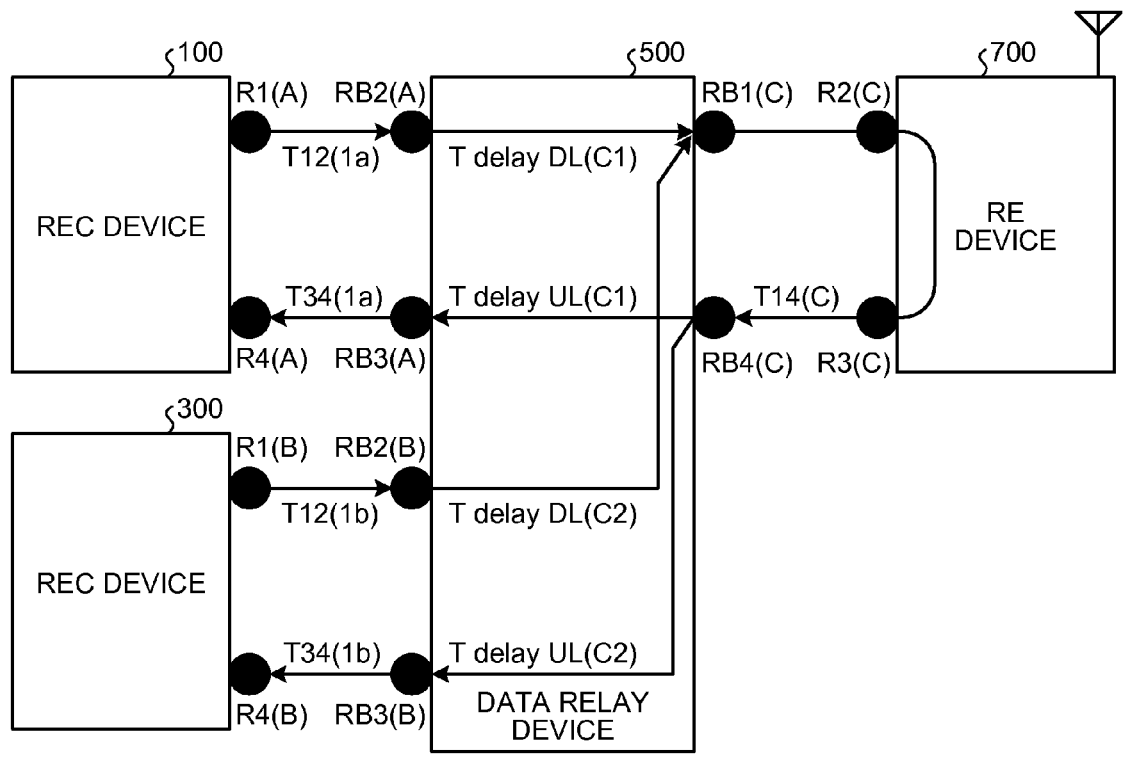
FIG. 5 is a view schematically illustrating each device illustrated in FIG. 2 focusing on the flow of a frame.

Next, a T14 delay measuring technique in the REC device 100 and the REC device 300 according to the first embodiment will be explained with reference to FIGS. 5, 6, and 7. FIG. 5 is a view schematically illustrating the respective devices illustrated in FIG. 2 focusing on only the flow of the frame. As illustrated in FIG. 5, the T14 delay of the REC device 100 is referred to as a time from when the frame which is the basis is output from an output terminal R1(A) of the REC device 100 to when the frame is input to an input terminal R4(A) of the REC device 100 via an input terminal RB2 (A) and an output terminal RB1(C) of the data relay device 500, an input terminal R2(C) and an output terminal R3(C) of the RE device 700, and an input terminal RB4(C) and an output terminal RB3(A) of the data relay device 500. That is, the T14 delay is "T12(1a)+T delay DL(C1)+T14(C)+T delay UL(C1)+T34(1a)."

T12(1a) is referred to as a transmission time from when the frame is output from R1(A) to when the frame is input to RB2(A). T delay DL(C1) is referred to as a processing time for performing downlink data relay between the REC device 100 and the RE device 700 through the data relay device 500. T14(C) is referred to as a delay measurement result between the data relay device 500 and the RE device 700. T delay UL(C1) is referred to as a processing time for performing uplink data relay between the REC device 100 and the RE device 700 through the data relay device 500. T34(1a) is referred to as a transmission time from when the frame is output from RB3(A) to when the frame is input to R4(A).

Figure 6:
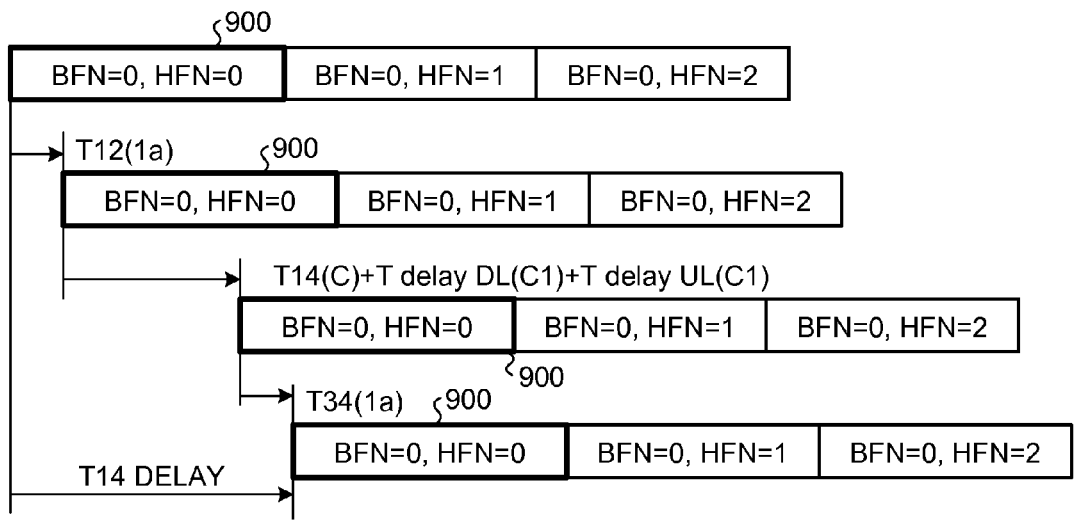
FIG. 6 is a flowchart when a frame which is the basis of measuring a T14 delay through the REC device is output to or output from each device.

That is, as illustrated in FIG. 6, a frame 900, as the basis, of the REC device 100 output from R1(A) is input to RB2(A) after T12(1a). The frame 900 is output from RB3(A) after T14(C)+T delay DL(C1)+T delay UL(C1). The frame 900 is output with delay as described above because the frame producing unit 605 changed the frame value received from the frame value detecting unit 604. The frame 900 is input to R4(A) after T34(1a). Therefore, the REC device 100 can measure the T14 delay by measuring a time from when the frame is output from its own device to when the frame is input to its own device again.

Further, as illustrated in FIG. 5, the T14 delay of the REC device 300 is referred to as a time from when the frame which is the basis is output from an output terminal R1(B) of the REC device 300 to when the frame is input to an input terminal R4(B) via an input terminal RB2(B) and the output terminal RB1(C) of the data relay device 500, the input terminal R2(C) and the output terminal R3(C) of the RE device 700, and the input terminal RB4(C) and an output terminal RB3 (B) of the data relay device 500. That is, the T14 delay is "T12(1b)+T delay DL(C2)+T14(C)+T delay UL(C2)+T34 (1b)".

T12(1b) is referred to as a transmission time from when the frame is output from R1(B) to when the frame is input to RB2(B). T delay DL(C2) is referred to as a processing time for performing downlink data relay between the REC device 300 and the RE device 700 through the data relay device 500. T14(C) is referred to as a delay measurement result between the data relay device 500 and the RE device 700. T delay UL(C2) is referred to as a processing time for performing uplink data relay between the REC device 300 and the RE device 700 through the data relay device 500. T34(1b) is referred to as a transmission time from when the frame is output from RB3(B) to when the frame is input to R4(B).

Figure 7:
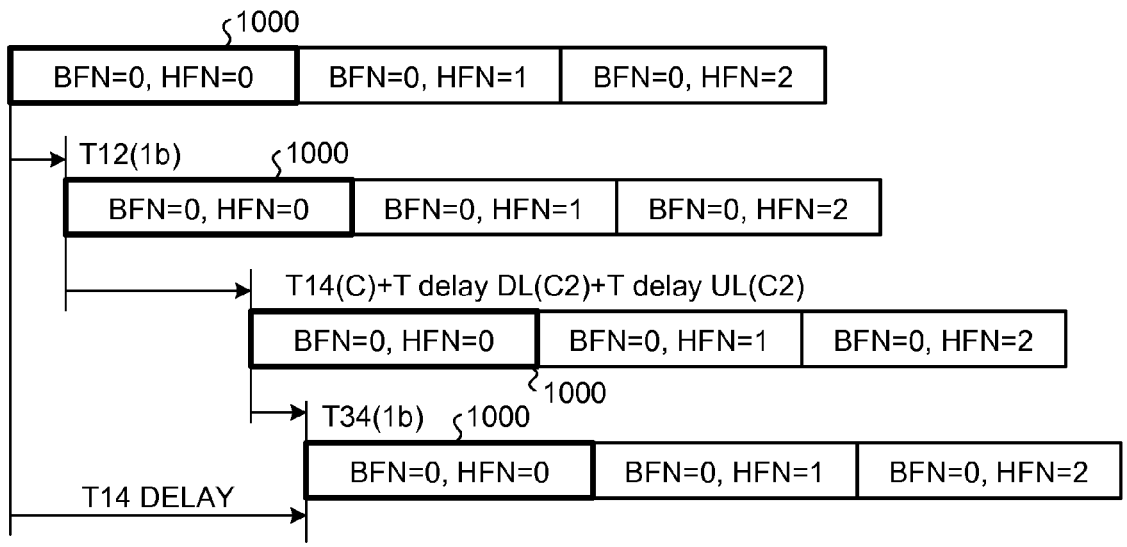
FIG. 7 is a flowchart when a frame which is the basis of measuring a T14 delay through the REC device is output to or output from each device.

That is, as illustrated in FIG. 7, a frame 1000, as the basis, of the REC device 300 output from R1(B) is input to RB2(B) after T12(1b). The frame 1000 is output from RB3(B) after T14(C)+T delay DL(C2)+T delay UL(C2). The frame 1000 is output with delay as described above because the frame producing unit 607 changed the frame value received from the frame value detecting unit 606. The frame 1000 is input to R4(B) after T34(1b). Therefore, the REC device 300 can measure the T14 delay by measuring a time from when the frame is output from its own device to when the frame is input to its own device again.

Figure 8:
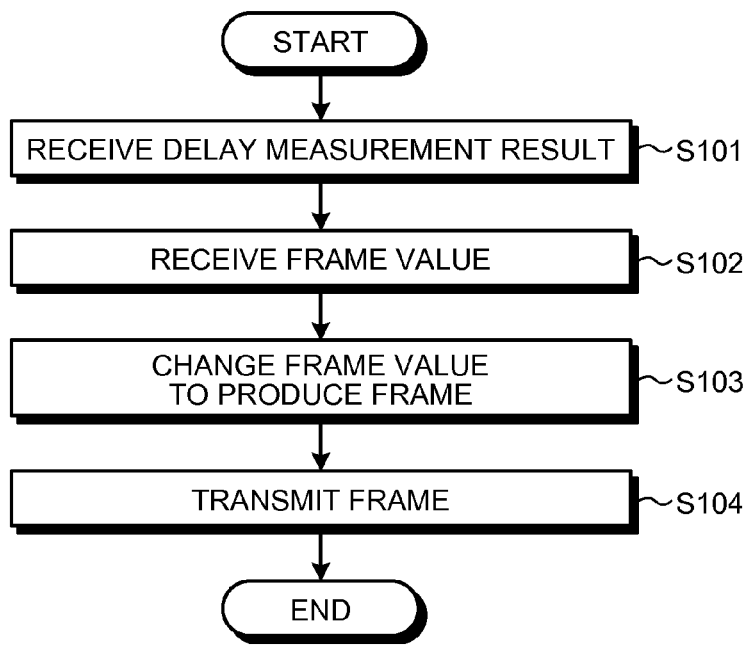
FIG. 8 is a flowchart illustrating the flow of processing of a frame producing unit related to T14 delay measurement of the REC device.

Next, the processing flow of the frame producing unit 605 of the data relay device 500 related to T14 delay measurement will be explained. FIG. 8 is a flowchart illustrating the processing flow of the frame producing unit 605 related to T14 delay measurement of the REC device 100. The processing flow illustrated in FIG. 8 is executed in the similar manner even in the frame producing unit 607.

First, the frame producing unit 605 receives the delay measurement result between the data relay device 500 and the RE device 700 from the delay measuring unit 603 (step S101). The frame producing unit 605 receives the frame value from the frame value detecting unit 604 (step S102).

The frame producing unit 605 changes the frame value based on the delay measurement result received from the delay measuring unit 603 and the processing time required for data relay of the data relay device 500 to produce the frame (step S103). The frame producing unit 605 transmits the frame to the REC device 100 (step S104) and ends the processing related to T14 delay measurement.

As described above, the data relay device 500 according to the first embodiment performs delay measurement between its own device and the RE device 700. When the frame which is the basis of T14 delay measurement is received from the REC device 100, the data relay device 500 delays the frame by the sum of the measured time and the processing time required for data relay of its own device and then returns the same frame to the REC device 100. Further, the data relay device 500 performs the same delay control on the frame which is the basis received from the REC device 300.

Therefore, the REC device 100 and the REC device 300 can measure the T14 delay, respectively, by measuring the time between transmission and reception of the frame which is the basis. That is, even when a plurality of REC devices shares the RE device, each REC device can measure the T14 delay.

Further, the data relay device 500 does not need to be disposed between the REC device 100 or the REC device 300 and the RE device 700. For example, the REC device 100 may have the same function as the above described data relay device 500.

[b] Second Embodiment

The first embodiment has been described in connection with the case in which the data relay device independently produces the frame for performing delay measurement between its own device and the RE device, but a second embodiment will be described in connection with a case in which the frame produced by one REC device is used. The REC device in which the frame is used preferably measures the T14 delay based on the T14 delay measuring technique stated in the CPRI standard (v3.0). In the below description, the same parts as the parts described above are denoted by the same reference numerals as in the parts described above, and thus detail description thereof will not be repeated.

Figure 9:
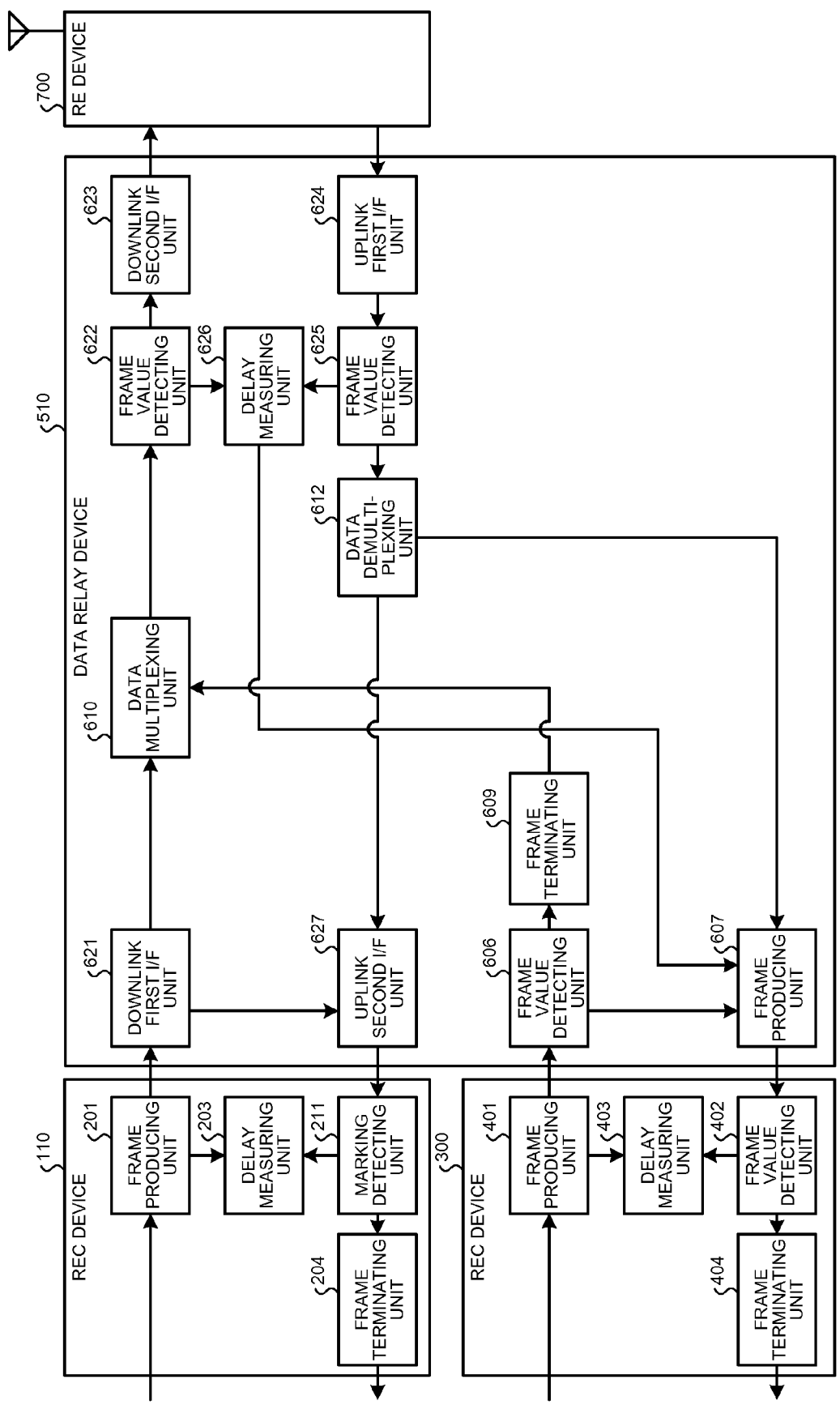
FIG. 9 is a block diagram illustrating structures of a data relay device and REC devices connected to the data relay device according to a second embodiment.
Figure 10:
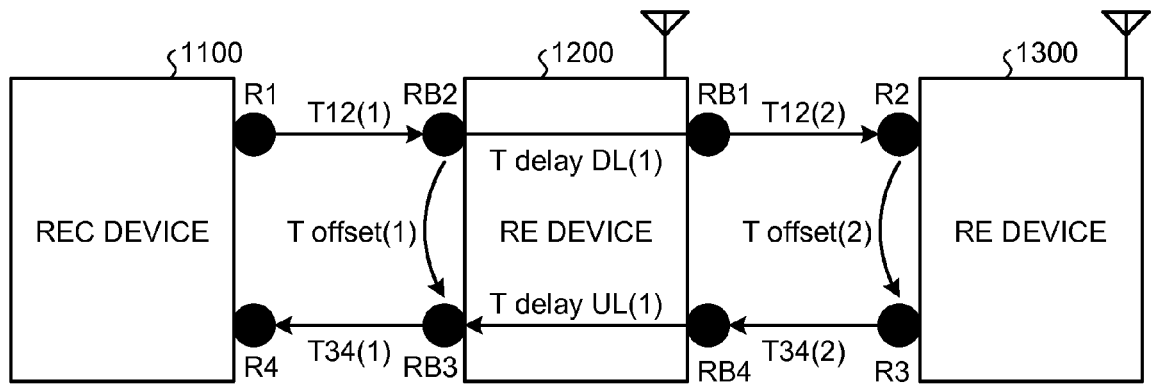
FIG. 10 is a view for explaining a T14 delay measuring technique stated in a CPRI standard (v3.0)
Figure 11:
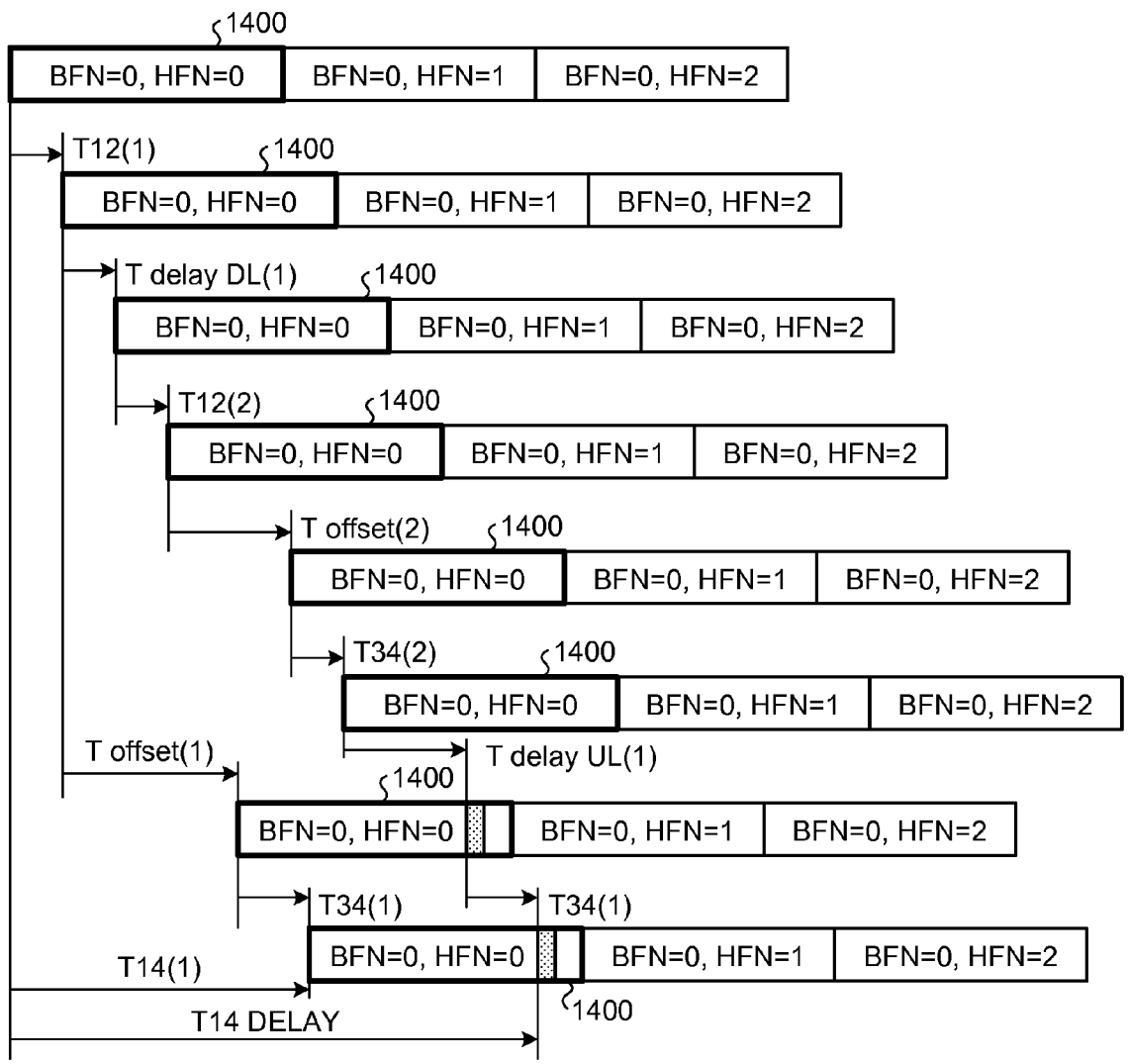
FIG. 11 is a view for explaining a T14 delay measuring technique stated in a CPRI standard (v3.0)
Figure 12:
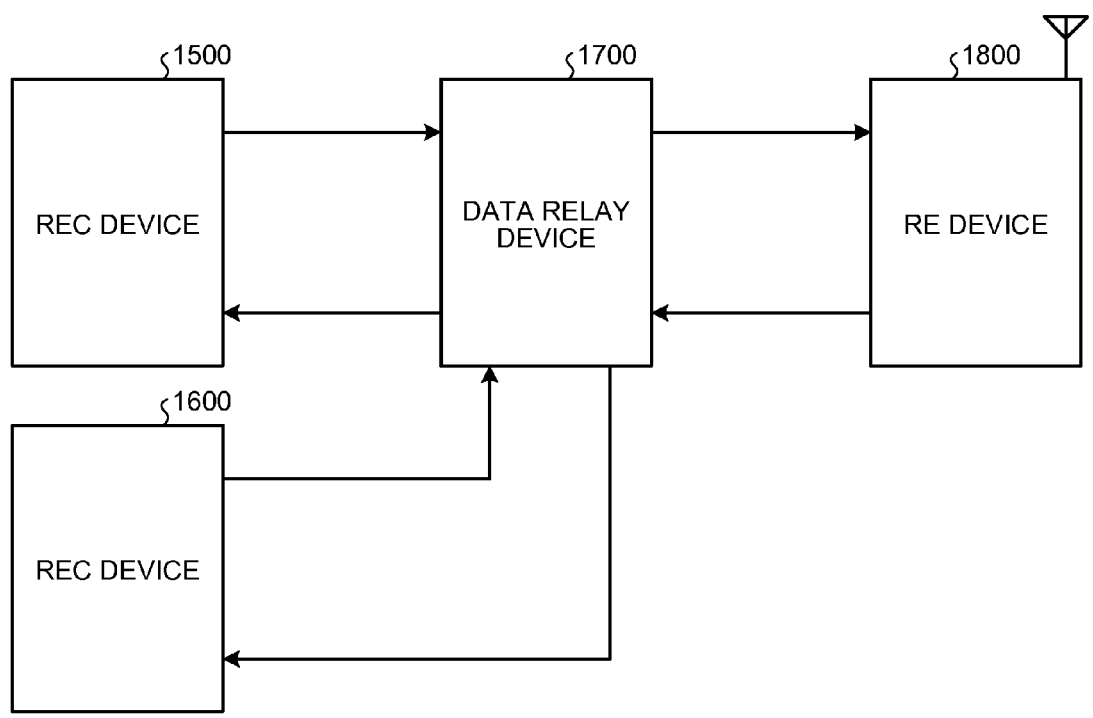
FIG. 12 is a view for explaining a problem of a conventional technique.

FIG. 9 is a block diagram illustrating structures of a data relay device and REC devices connected to the data relay device according to a second embodiment. As illustrated in FIG. 9, a data relay device 510 includes a downlink first I/F unit 621, a frame value detecting unit 622, a downlink second I/F unit 623, a uplink first I/F unit 624, a frame value detecting unit 625, a delay measuring unit 626, a uplink second I/F unit 627, a frame value detecting unit 606, a frame producing unit 607, a frame terminating unit 609, a data multiplexing unit 610, and a data demultiplexing unit 612. A REC device 110 includes a marking detecting unit 211, a frame producing unit 201, a delay measuring unit 203, and a frame terminating unit 204. A REC device 300 includes a frame producing unit 401, a frame value detecting unit 402, a delay measuring unit 403, and a frame terminating unit 404. FIG. 9 illustrates the structures of the REC device 110 and the REC device 300 only related to T14 delay measurement.

Referring to FIG. 9, the REC device 110 measures the T14 delay based on the T14 delay measuring technique stated in the CPRI standard (v3.0). That is, the data relay device 510 measures a delay between its own device and the RE device 700 by using the frame produced by the REC device 110. A processing operation of each of the components related to T14 delay measurement will be explained below.

The frame producing unit 201 of the REC device 110 produces the frame that conforms to the CPRI standard and transmits the frame to the data relay device 510. Specifically, the frame producing unit 201 stores the frame value in a 0-th word of the basic frame at the head of the hyper frame and outputs the control signal to the delay measuring unit 203 when the stored frame value is the same as a preset frame value.

The downlink first I/F unit 621 receives the frame from the REC device 110 and outputs the received frame to the data multiplexing unit 610 and the uplink second I/F unit 627.

The frame value detecting unit 622 detects the frame value of the frame that is output from the data multiplexing unit 610 and is to be input to the downlink second I/F unit 623 to be described below and outputs the control signal to the delay measuring unit 626 when the detected frame value is the same as a preset frame value.

The downlink second I/F unit 623 transmits the frame output from the frame value detecting unit 622 to the RE device 700. The uplink first I/F unit 624 receives the frame from the RE device 700 and outputs the received frame to the frame value detecting unit 625.

The frame value detecting unit 625 detects the frame value of the frame transmitted from the RE device 700. Specifically, the frame value detecting unit 625 detects the frame value of the frame that is output from the uplink first I/F unit 624 and is to be input to the data demultiplexing unit 612 and outputs the control signal to the delay measuring unit 626 when the detected frame value is the same as a preset frame value. The preset frame value is preferably the same as the frame value set by the frame value detecting unit 622.

The delay measuring unit 626 measures a delay between the data relay device 510 and the RE device 700. Specifically, the delay measuring unit 626 measures an elapsed time from when the control signal is received from the frame value detecting unit 622 to when the control signal is received from the frame value detecting unit 625 and outputs the measurement result to the frame producing unit 607.

The uplink second I/F unit 627 outputs the frames output from the downlink first I/F unit 621 and the data demultiplexing unit 612 to the REC device 110. At this time, the uplink second I/F unit 627 performs marking by giving information to the frame at a timing when the frame output from the downlink first I/F unit 621 and the frame output from the data demultiplexing unit 612 are superimposed on each other.

The marking detecting unit 211 of the REC device 110 outputs the control signal to the delay measuring unit 203 when information given as a result of marking is detected from the frame received from the data relay device 510. The delay measuring unit 203 measures an elapsed time from when the control signal is received from the frame producing unit 201 to when the control signal is received from the marking detecting unit 211. As described above, the REC device 110 measures the T14 delay based on the T14 delay measuring technique stated in the CPRI standard (v3.0).

Meanwhile, similarly to the first embodiment, the REC device 300 independently produces the frame through its own device and transmits the produced frame to the data relay device 510. The REC device 300 can measure the T14 delay by delay control of the frame through the data relay device 510.

As described above, the data relay device 510 according to the second embodiment measures the delay between its own device and the RE device 700 by using the frame produced by the REC device 110. When the frame which is the basis of measuring the T14 delay is received from the REC device 300, the data relay device 510 delays the frame by the sum of the measured time and the processing time required for data relay of its own device and then returns the frame to the REC device 300. The REC device 110 in which the frame is used measures the T14 delay based on the T14 delay measuring technique stated in the CPRI standard (v3.0).

Therefore, the REC device 300 can measure the T14 delay by measuring the time between transmission and reception of the frame which is the basis. That is, when a plurality of REC devices shares the RE device, each REC device can measure the T14 delay.

Further, the data relay device 510 does not need to be disposed between the REC device 110 or the REC device 300 and the RE device 700. For example, the REC device 110 may have the same function as the above described data relay device 510.

According to an aspect of the embodiments, even when a plurality of base station control devices shares a base station device, each base station control device can measure a data transmission time of round trip between its own device and the base station device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data relay device for relaying data transmitted between a base station device that performs radio communication with a mobile terminal and a plurality of base station control devices that controls the base station device, the data relay device comprising:
    a data transmission time acquiring unit that acquires a data transmission time from when data is transmitted from the data relay device to when the data is received by the data relay device via the base station device;
    a receiving unit that receives frames from the plurality of base station control devices, each frame independently produced by each of the plurality of base station control devices and the plurality of base station control devices are not synchronized;
    a frame value detecting unit that detects a predetermined frame value from received frames; and
    a frame transmitting unit that, when the predetermined frame value is detected, counts up an elapsed time from the detection, and transmits a frame having the same frame value as the detected frame value to the base station control device which transmits the frame of the detected predetermined frame value when the elapsed time from detection reaches the sum of a relay processing time of a data transmitted from the base station device to the base station control device in the data relay device, a relay processing time of a data transmitted from the base station control device to the base station device in the data relay, and the data transmission time.

2. The data relay device according to claim 1, further comprising: a frame producing unit that produces a predetermined frame, wherein the data transmission time acquiring unit measures a time from when the predetermined frame is transmitted from the data relay device to when the predetermined frame is received by the data relay device via the base station device and acquires the data transmission time by transmitting the predetermined frame produced by the frame producing unit to the base station device.

3. The data relay device according to claim 1, wherein the data transmission time acquiring unit measures a time from when the frame is transmitted from the data relay device to when the frame is received by the data relay device via the base station device and acquires the data transmission time by relaying the frame to the base station device.

4. A frame processing method for relaying data transmitted between a base station device that performs radio communication with a mobile terminal and a plurality of base station control devices that controls the base station device, the frame processing method comprising:

acquiring by a data relay device a data transmission time from when data is transmitted from the data relay device to when the data is received by the data relay device via the base station device;

receiving by the data relay device frames from the plurality of base station control devices, each frames independently produced by each of the plurality of base station control devices and the plurality of base station control devices are not synchronized;

detecting by the data relay device a predetermined frame value from received frames; and when the predetermined frame value is detected, counting up an elapsed time from the detection, and transmitting a frame having the same frame value as the detected frame value to the base station control device which transmits the frame of the detected predetermined frame value when the elapsed time from detection reaches the sum of a relay processing time of a data transmitted from the base station device to the base station control device in the data relay device, a relay processing time of a data transmitted from the base station control device to the base station device in the data relay, and the data transmission time.

5. The frame processing method according to claim 4, further comprising: producing a predetermined frame, wherein the acquiring includes measuring a time from when the predetermined frame is transmitted from the data relay device to when the predetermined frame is received by the data relay device via the base station device and acquiring the data transmission time by transmitting the predetermined frame produced in the producing to the base station device.

6. The frame processing method according to claim 4, wherein the acquiring includes measuring a time from when the frame is transmitted from the data relay device to when the frame is received by the data relay device via the base station device and acquiring the data transmission time by relaying the frame to the base station device.

* * * * *